United States Patent
Gates et al.

(10) Patent No.: US 7,155,109 B2
(45) Date of Patent: Dec. 26, 2006

(54) PROGRAMMABLE VIDEO RECORDER HAVING FLEXIBLE TRICK PLAY

(75) Inventors: Matthijs A. Gates, Seattle, WA (US); Jai Srinivasan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1134 days.

(21) Appl. No.: 10/172,313

(22) Filed: Jun. 14, 2002

(65) Prior Publication Data

US 2003/0231867 A1 Dec. 18, 2003

(51) Int. Cl.
  *H04N 5/91* (2006.01)
(52) U.S. Cl. ...................................... 386/68
(58) Field of Classification Search ............... 386/6, 386/7, 46, 52, 54, 55, 65, 67–69, 83, 95, 386/125, 126
  See application file for complete search history.

(56) References Cited

U.S. PATENT DOCUMENTS

| | | | | |
|---|---|---|---|---|
| 5,647,047 | A * | 7/1997 | Nagasawa | 386/52 |
| 6,169,843 | B1 * | 1/2001 | Lenihan et al. | 386/46 |
| 6,621,979 | B1 * | 9/2003 | Eerenberg et al. | 386/68 |
| 6,792,195 | B1 * | 9/2004 | Barton | 386/46 |

OTHER PUBLICATIONS

Trick Play Schemes for Advanced Television Recording on Digital VCR, Hou-Chun Ting and Huesh-Ming Hang, IEEE Transactions on Consumer Electronics, U.S.A., Nov. 1995, vol. 41, No. 4, pp. 1159-1168.
A Digital VCR Coding Scheme for HDTV Recording and Multi-Speed Playback Operation, Jae-Hyun Kim, Goo-Man Park and Yong-Je Kim, Third International Symposium on Consumer Electronics, Hong Kon,g 1994, Part vol. 1, pp. 39-44.
Adaptation and Improvement of CCITT Reference Model 8 Video Coding for Digital Storage Media Applications, C. Herpel,, D. Hepper and D. Westerkamp, Signal Processing: Image Communication, Netherlands, 1990, vol. 2, No. 2, pp. 171-185.

* cited by examiner

*Primary Examiner*—James J. Groody
*Assistant Examiner*—Christopher Onuaku
(74) *Attorney, Agent, or Firm*—Workman Nydegger

(57) ABSTRACT

A computing system connected to storage medium and one or more rendering devices identifies and processes only selected frames of data that are stored on the storage medium, thereby reducing the resources and bandwidth is required to process and transmit the data to the rendering device(s) at a desired playback. The computing system has various modes for selecting the frames to be processed and transmitted. In one mode, all frames are selected. In another mode, only the key frames are selected. In yet other modes, only certain key frames are selected. Upon selecting the frames to be transmitted to the rendering device(s), the time stamps assigned to the selected frames are scaled so that the selected frames will be displayed for an appropriate duration of time that corresponds with the desired playback rate.

54 Claims, 7 Drawing Sheets

PROGRAMMABLE VIDEO RECORDER HAVING FLEXIBLE TRICK PLAY

BACKGROUND OF THE INVENTION

1. The Field of the Invention

The present invention is directed to methods for rendering data at variable playback rates and, more particularly, to methods for a device such as a programmable video recorder (PVR) to process recorded data for enabling the recorded data to be rendered at variable playback rates.

2. Related Technology

The ability to record broadcasting data, such as movies, television shows and sporting events has significantly increased the conveniences and viewing options available to viewers. For example, a program that is broadcast while a viewer is traveling, working, or away from home can be recorded and watched at a later time. Even when the viewer is able to coordinate their schedule to watch the broadcast of a program, the viewer may still choose to record the program so that the program can be watched at a later time and in a different manner than it was broadcast. For example, the viewer may choose to fast-forward through commercials or other undesired segments of the program. The viewer may also choose to watch portions of the program in slow motion, fast motion, in reverse, and so forth.

Recent advances in broadcasting technology have enabled digital data to be broadcast and recorded, which has further enhanced the viewing experience and options available to consumers. For instance, digital data can often provide better picture and sound quality than analog data. Digital recordings can also be searched more quickly than analog recordings because they can be displayed at high speeds (e.g. 64x). Accordingly, some viewers have found it desirable to watch and record programs in a digital format.

The Programmable Video Recorder (PVR), also known as the Digital Video Recorder (DVR), is one device that is capable of enabling the viewer to watch and record digital broadcast data. One significant advantage provided by the PVR is that it is capable of recording digital data at the same time it accesses and plays different digital data. This is useful because it enables the display of the program to be manipulated by the viewer without causing any interruption to the recording of the program. For example, the PVR enables a viewer to pause, rewind or watch a replay of an event in a program, at the same time the program is broadcast and recorded by the PVR. The programming data that is received during this time is recorded to a storage medium so that it can be accessed at a later time. Accordingly, the viewer can later resume watching the program, as desired, including the portions of the program that were broadcast and recorded to the storage medium.

In addition to recording and playing broadcast data, the PVR can also be used to play programs that are commercially distributed on computer-readable medium, such as a Compact Disk (CD), a Digital Video Disk (DVD), and other storage media. As mentioned above, the PVR and other digital playing devices provide trick play functionality, which is the ability to alter the playback rate of the recorded data, so that the recorded program can be played back at a different rate than it was broadcast. This is useful, for instance, for enabling a viewer to visually search through a program at a high speed (e.g. 64x). Trick play functionality also enables the recorded program to be played back in slow motion, in fast motion, in reverse, and so forth.

One problem with the trick play functionality, however, is that the playback rate is constrained to only a limited set of playback speeds which are built into the PVR devices (e.g. 2x, 4x, 8x, 16x, 32x and 64x). Accordingly, a viewer is unable to play the recorded program at other playback rates that may be desirable to the viewer.

The playback rate enabled by existing PVR devices can also be limited by other constraints, such as, for example, the bandwidth capacity of the communication link between the PVR and the rendering device. For example, if the playback rate of 64x requires a bandwidth that surpasses the capacity of the communication link, the rendering device will not receive all of the programming data that is required to playback the program at the desired rate.

BRIEF SUMMARY OF THE INVENTION

The present invention is directed to improved methods for processing recorded data with Programmable Video Recorders (PVRs) and other similar devices so that the recorded data can be rendered by one or more rendering devices at variable playback rates.

According to one aspect of the invention, a computing system such as a PVR is connected with a storage medium and multiple rendering devices. The storage medium stores multimedia data (such as video and/or audio data) that includes a plurality of frames that are time stamped in accordance with an intended playback rate. During use, at least some of the frames are transmitted from the PVR to the rendering devices, where the selected frames are decoded and rendered by the rendering devices at a desired playback rate. The desired playback rate may be a rate selected by a user or a rate that is automatically triggered when certain events occur. For example, when commercials are detected, the computing system may automatically initiate playback at an accelerated and desired playback rate.

According to one embodiment, the PVR determines that the data should be played back at a desired playback rate that is different than the intended playback rate dictated by the assigned time stamps of the data. Thereafter, the PVR determines that only selected frames of the data should be transmitted to an appropriate rendering device. The PVR then selects certain key frames to be rendered and sends the selected key frames to the appropriate rendering device, where the frames are decoded and rendered. Prior to rendering the transmitted frames, the time stamp assigned to each of the selected key frames is scaled so that the selected key frames will be displayed for an appropriate duration of time, corresponding with the desired playback rate.

According to one aspect of the invention, the selected key frames are identified and selected through an iterative process that includes the acts of identifying and selecting key frames as they are encountered while advancing through the data, calculating an incremental duration of multimedia data to skip over after each selected key frame is selected, skipping over the incremental duration of multimedia data, and then identifying and selecting the next key frame encountered.

According to one embodiment, the act of calculating an incremental duration of multimedia data to skip over includes the use of an algorithm. The algorithm may include an accelerator parameter for increasing the duration of multimedia data that is skipped over, thereby further reducing the number of key frames that are selected, decoded and rendered. According to one embodiment, the value of the accelerator varies during playback to accommodate for changes that occur in the capacity of the communication link to process and transmit data to the rendering device. The capacity of the PVR to transmit data to the rendering device can change, for example, when the PVR is required to transmit other data to other rendering devices to simultaneously satisfy multiple user requests for the data, thereby efficiently sharing the available bandwidth.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention extends to methods, systems and computer program product for processing digital data so that the data can be rendered by one or more rendering devices at desired playback rates.

According to one aspect of the invention, a computing system, such as a Programmable Video Recorder (PVR), has access to multimedia data that is stored on a storage medium. The multimedia data may include audio and video data, for example, and is composed of a plurality of frames that are assigned time stamps that correspond with an intended playback rate for rendering the multimedia data on an appropriate rendering device. The PVR processes and transmits selected portions of the multimedia data to the rendering devices to be decoded and rendered at desired playback rates designated by a user.

The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
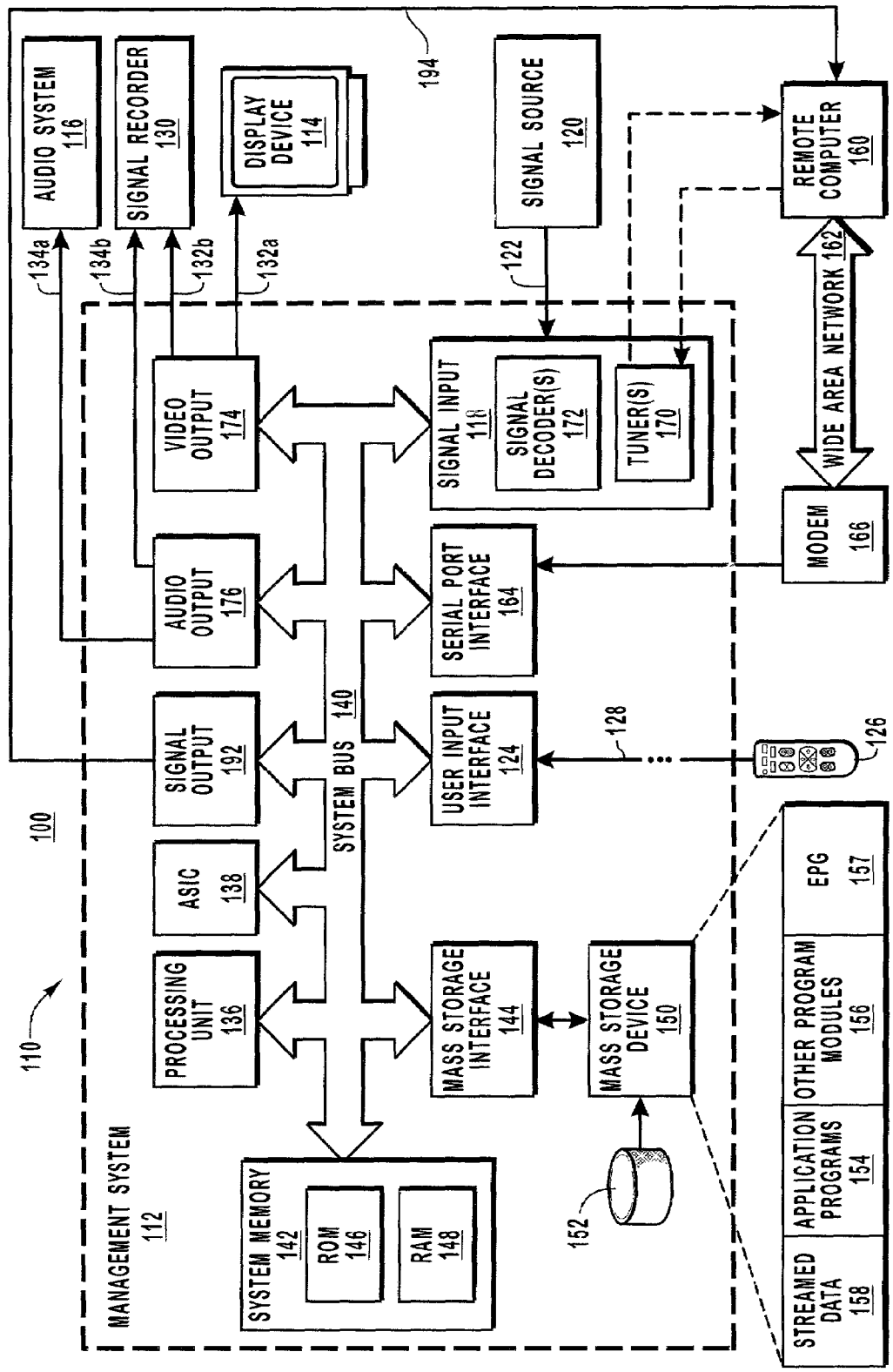
FIG. 1 illustrates one suitable network environment for practicing the methods of the invention.

FIG. 1 and the corresponding discussion provide a general description of a network 100 in which the present invention may operate. In one embodiment, the present invention is implemented in a network 100 that uses a conventional television screen or other rendering device that displays video information and/or plays audio information. For example, audio system 116 is a rendering device. In addition, remote computer 120 may have associated rendering devices.

The network 100 includes a programmable video recorder (PVR), digital video recorder (DVR) or a similar device that has been adapted to perform the operations that include receiving, writing, reading, and decoding digital data so that it can be rendered in some desired manner. Digital data may include streamed data that has been formatted in such a manner that it can be accessed and rendered while it is being received, without having to first receive the entire contents of the streamed data.

FIG. 1 illustrates an entertainment system 110 that includes a management system 112, a display device 114 and an audio system 116. Management system 112 may be a PVR that has been adapted to perform the operations disclosed herein. Management system 112 may be integrally positioned with or separate from display device 114, which may be a high definition television display, a standard television display, a flat panel display, a projection device, a high definition television display, a computer monitor, or any other device capable of displaying viewable video image data. Audio system 116 may be a speaker, a stereo system, or any device capable of emitting sound data, and similarly may be integrally positioned with or separate from display device 114.

Management system 112 includes a signal input 118, which receives multimedia data from a signal source 120. The multimedia data is transmitted from signal source 120 to signal input 118 via an input line 122, which can be a cable or optic connection, a terrestrial antenna system, a satellite system, or any device or system capable of transmitting multimedia data to management system 112.

The signal source 120 may be either a single channel signal source or a multiple channel signal source. A single channel signal source provides programming from a recorded medium, such as a videocassette, compact disc, etc. Examples of a single channel signal source include a VCR, a DVD, and the like. Alternatively, a multiple channel signal source includes any system or device that is capable of sending a signal that may be received by a satellite receiver, a cable or optic connection, a terrestrial antenna, or the like. Examples of a multiple channel signal source include DSS/DVB, a cable box, locally broadcast programming (i.e. programming broadcast using UHF, VHF, or ATVEF), and the like.

While FIG. 1 illustrates home entertainment system 110 as having a single programming input line 122 and a single signal source 120, there can instead be a plurality of programming input lines that transmit programming from a plurality of signal sources. In such embodiments, the home entertainment system 110 may receive the multimedia data from one signal source or from a plurality of signal sources at a time.

Management system 112 also includes a user input interface 124, which receives input from an input device 126, such as a remote control, keyboard, microphone, or any other device capable of generating electronic instructions for management system 112. Input device 126 is communicatively coupled to management system 112 over an input link 128 so as to enable such control. Input device 126 generates electronic instructions over input link 128 in response to preprogrammed data or in response to a viewer pressing buttons on input device 126. Input device 126 may also control Web browser software within management system 112 as when the management system 112 receives multimedia data through an Internet connection.

FIG. 1 further illustrates a signal recorder 130, which is capable of receiving multimedia data, including video and audio data, and which is further capable recording the multimedia data on a storage medium associated with the management system 112. Video signals are transmitted to signal recorder 130 and display device 114 by video image links 132a and 132b, respectively, examples of which include a radio-frequency ("RF") link, an S-video link, a composite link, or any other equivalent form of video image link. Similarly, audio links 134a and 134b transmit audio data from management system 112 to audio system 116 and to signal recorder 130, respectively.

The operation of management system 112 is controlled by a central processing unit ("CPU"), illustrated as processing unit 136, which is coupled to an application-specific integrated circuit ("ASIC") 138 and uses computer-executable instructions implemented in software and/or hardwired logic circuitry. Processing unit 136 and ASIC 138 are coupled via a system bus 140, which also interconnects various other system components, such as the system memory 142, mass storage interface 144, user interface 124 and signal input 118. Processing unit 136 executes software designed to implement features of management system 112 including features of the present invention. ASIC 138 contains circuitry that is used to implement certain functions of management system 112. Instructions, data, and other software necessary for the operation of processing unit 136 and ASIC 138 may be stored in the system memory 142, such as in read-only memory ("ROM") 146 and/or in random-access memory ("RAM") 148, and/or in a mass storage device 150, which is coupled to mass storage interface 144. ROM 146, RAM 148 and mass storage device 150 are communicatively coupled to ASIC 138 so as to be readable by ASIC 138 and so that data may be written from ASIC 138 to RAM 148 and possibly mass storage device 150.

Mass storage device 150 may be a magnetic hard disk 152 or any other magnetic or optical mass memory device that is capable of storing large amounts of data. Any desired computer-readable instructions or data, including application programs 154, other program modules 156, and an electronic programming guide ("EPG") 157, which specifies the broadcast times and channels of programs can be stored in mass storage device 150. Mass storage device 150 can also be used to record digital data 158, including audio and video multimedia data.

In the embodiment where management system 112 receives multimedia data from the Internet, management system 112 communicates with a remote computer 160 via a wide area network ("WAN") 162 by including a serial port interface 164 that is interposed between the system bus 140 and a modem 166, a wireless link, or other means for establishing communications over a WAN that may be internal or external to management system 112. Management device 112 is also capable of transmitting information and receiving multimedia data via the Internet by direct-dial communication over standard telephone lines, or by using any other available communication medium.

Referring now to signal input 118, if the signal on programming input line 122 includes multiple channels that are each receiving different streams of data, a tuner 170 included in signal input 118 tunes to a selected channel in the signal. Multiple tuners 170 can be used to provide enhanced features, such as recording multimedia data from one channel while viewing streamed data on another channel, and recording digital data from a plurality of channels simultaneously. A signal decoder 172 converts video data from an analog format to a digital format, or from a digital format to an analog format, as necessary. Signal decoder 172 can also decode, decompress, and split audio, video, meta and other data from a compressed stream format (e.g. MPEG, ASF). In embodiments where the management system 112 includes multiple tuners 170, management system 112 may also include multiple signal decoders 172 to perform the operations disclosed herein.

Management system 112 also includes a video output 174 and an audio output 176 which are useful for transmitting data to rendering devices such as display device 114 and audio system 116. It will be appreciated, however, that the management system 112 is not limited to transmitting data to local rendering devices. In particular, the management system 112 can also transmit data to any number of remote computing devices, such as remote computer 160, which can be independently configured to read data stored in the mass storage device 150 of the management system 112 and to transmit the data to other rendering devices. The remote computer 160 can directly receive the data from the management system 112 through signal output 192 and output line 194. The output line 194 can be a cable or optic connection, a terrestrial antenna system, a satellite system, or any device or system capable of transmitting streamed data to management system 112. Alternatively, the remote computer 160 can indirectly receive the data from the management system 112 through the wide area network 162.

While FIG. 1 and the corresponding discussion above provide a general description of a suitable environment in which the invention may be implemented, it will be appreciated that the features of the present invention disclosed herein may be practiced in association with a variety of different system configurations.

Figure 2:
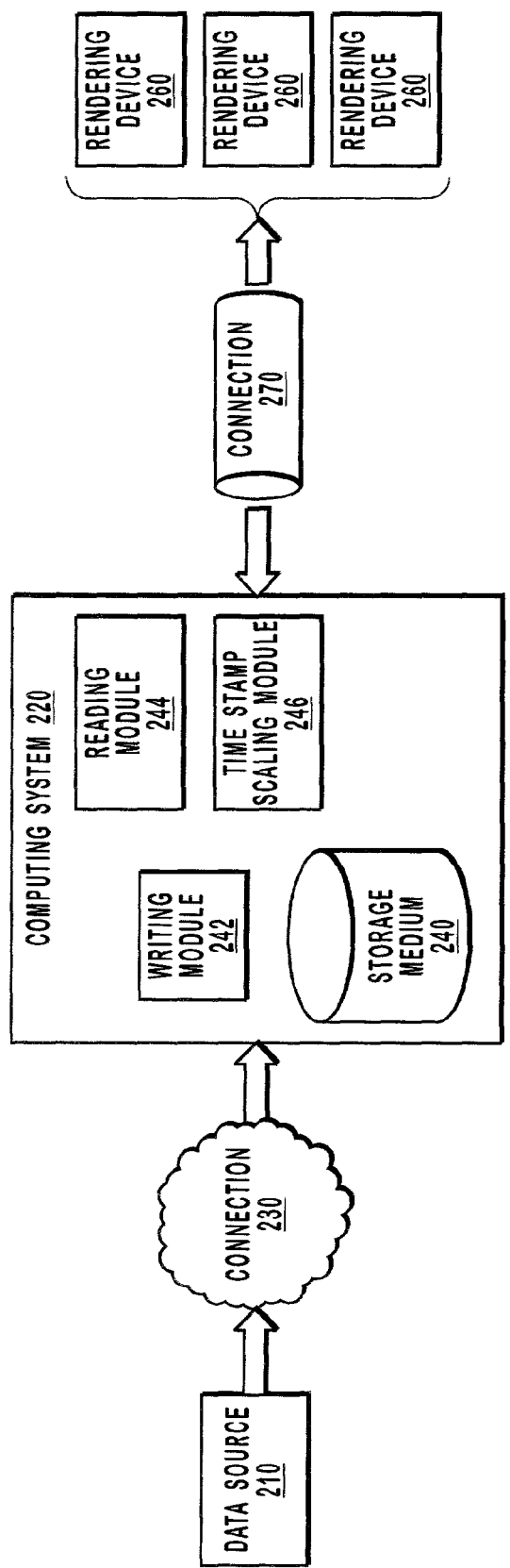
FIG. 2 illustrates a computing system which is connected to a plurality of rendering devices.

FIG. 2 illustrates one suitable environment for practicing the methods of the invention. As shown, a computing system 220, such as a PVR, is connected to a storage medium 240 and plurality of rendering devices 260. During use, the computing system 220 processes multimedia data stored on the storage medium 240 and transmits the data to the rendering devices 260 so the data can be rendered. Each of the rendering devices 260 may include a television, a monitor, an audio system, and other devices that are capable of displaying video data and/or playing audio data.

In the present embodiment, a data source 210 provides multimedia data to the computing system 220 over connection 230 for subsequent storage in storage medium 240. The multimedia data provided to the computing system 220 may include, but is not limited to, streamed video and audio data. The connection 230 between the data source 210 and the computing system 220 can include any suitable connection, including cable and optic connections, terrestrial antenna systems, satellite systems, and any other device or system capable of transmitting data to computing system 220.

Upon receiving the multimedia data from the data source 210, the computing system writes the multimedia data to the storage medium 240. Storage medium 240 generally includes a buffer for buffering the data. The storage medium 240 may include temporary memory as well as permanent memory. Although the storage medium 240 is shown to be disposed within the computing system 220, it will also be appreciated that the computing system 220 is not limited to only utilizing data stored on a storage medium 240 that is integrated within the computing system 220. For example, according to one embodiment, the computing system 220 may also be used in combination with detachable, portable and remote storage media. Accordingly, storage medium 240 can include a Compact Disk (CD), a Digital Video Disk (DVD), and other removable storage media.

As illustrated in FIG. 2, the computing system 220 also includes a plurality of modules 242, 244, and 246 for implementing the methods of the invention, as disclosed herein. Each of the illustrated modules 242, 244, and 246 will now be described.

The writing module 242 is configured to receive data from the data source 210, through connection 230, and to write the received data to storage medium 240 so that the data can be accessed at a later time. When necessary, the writing module 242 is also used to decompress, de-multiplex and split the data into appropriate data samples, such as audio and video samples, that may be stored and indexed within the storage medium 240. The writing module 242 may also be configured to assign time stamps to the data as it is received unless appropriate time stamps are already assigned to the data. The time stamps assigned to the data correspond with an intended playback rate for rendering the data when the data is finally displayed.

The reading module 244 is configured to read data that is stored on the storage medium 240 in response to appropriate user requests for the data to be rendered on one or more rendering devices 260 that are connected to the computing system 220. According to one embodiment, the reading module 244 is appropriately configured to receive and process multiple user requests at the same time.

The time stamp scaling module 246 is configured to scale time stamps that are assigned to the data before the data is rendered by an appropriate rendering device 260. According to one embodiment, the time stamp scaling module 246 changes the time stamps assigned to the data in response to a user request for data to be played back at a different rate than the intended playback rate. The time stamp scaling module 246 automatically scales selected frames from the data that are to be transmitted to the rendering devices, as described below in more detail, with specific reference to FIGS. 5–7. Although the time stamp scaling module 246 is shown to be included within the computing system 220, it may also be located within one or more of the rendering devices 260. In particular, the rendering devices may scale time stamps assigned to the selected frames upon decoding the selected frames, once received from the computing system 220.

Data that is processed by the computing system 220 (e.g. read by the reading module 244, scaled by the time stamp scaling module 246) is ultimately transmitted to appropriate rendering devices 260 through an appropriate communication link, such as connection 270. Connection 270 may include any suitable communication link, including cable and optic connections, terrestrial antenna systems, satellite systems, and other devices and systems capable of transmitting data to the rendering devices 260. The connection 270 may also include other devices that are remote from the computing system 220 and through which the selected frames are transmitted during use. The remote devices, which are not presently illustrated, may include any computing device, storage medium or software application.

Connection 270 is presently illustrated as a pipe to reflect that the connection 270 may have a finite capacity to transmit data to the rendering devices 260. The capacity of the connection 270 may be constrained at the computing system 220, at the rendering devices 260, or at any point therebetween. When the finite capacity of connection 270 is exhausted, additional data is prevented from being transmitted to the one or more rendering devices 260. This is a problem because when data is unable to be transmitted to the rendering devices, the data cannot be rendered in a desired manner and at a desired rate. Accordingly, it is desirable that the capacity of the connection 270 to transmit data is sufficient to transmit all of the data which is processed by the computing system 220. However, for various reasons disclosed herein, the capacity of the connection 270 to transmit data may occasionally be exceeded, thereby leading to the loss of data that is processed by the computing system 220.

One method for overcoming this problem is to minimize the amount of data that is transmitted through the connection 270 at any given time, thereby reducing the likelihood that the capacity of the connection 270 will be exceeded. Methods for reducing the amount of data that is transmitted to the rendering devices are described below in more detail with specific reference to FIGS. 3 and 5–7.

According to one aspect of the invention, multiple rendering devices 260 can each receive different data from the computing system 220 at the same time according to different user requests. Upon receiving the data, the rendering devices 260 decode and render the data. Inasmuch as multiple data transmissions may occur simultaneously through connection 270, it is sometimes necessary to manage and prioritize the user requests so that it can be determined which data transmissions will be minimized, based on priority, to avoid exceeding the capacity of connection 270.

The computing system 220 is able to manage and process multiple user requests with the various modules described above, thereby helping to ensure that the capacity of connection 270 is never exceeded.

Figure 3:
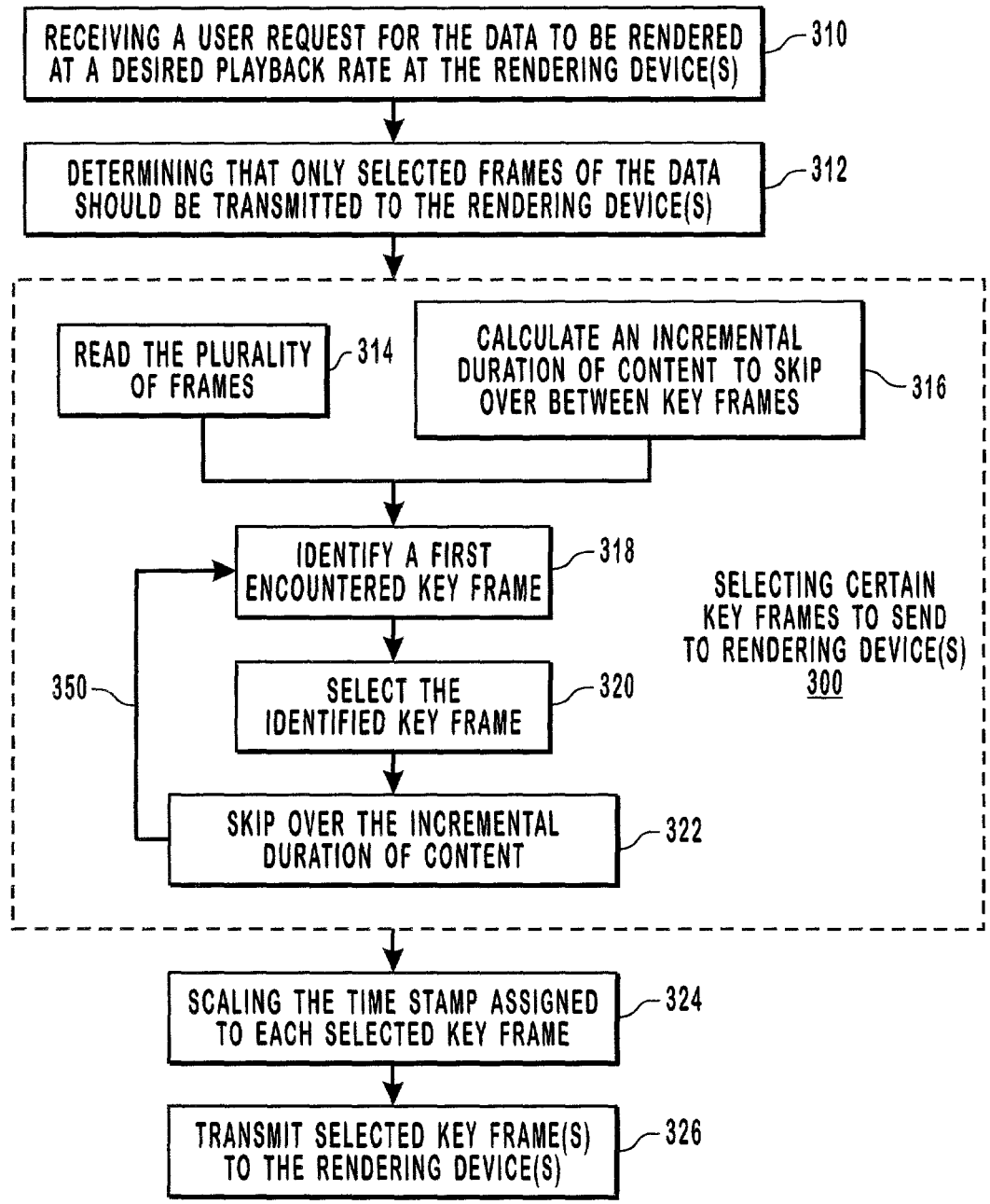
FIG. 3 illustrates a flow chart of one method for selecting certain key frames of stored data to be sent to appropriate rendering device(s) for enabling the rendering device(s) to render the data at a desired playback rate.

FIG. 3 illustrates a method for selecting data and scaling the time stamps assigned to data to thereby minimize the amount of data that must be processed and transmitted to the rendering devices. This is useful, as generally described herein, for helping ensure that the capacity of the communication link between the computing system 220 and the rendering devices 260 is not exceeded. As shown, the method includes a step for selecting certain key frames to send to the rendering device(s) (step 300), corresponding acts of the step (acts 314, 316, 318, 320, and 322), and various other acts (acts 310, 312, 324 and 326) that are performed by the computing system 220, each of which will now be described.

Initially, the computing system 220 receives a user request for the stored data to be rendered at a desired playback rate by one or more rendering devices (act 310). The term "user request" should be construed very broadly to also include predetermined criteria established by a user that trigger the method of the invention. For example, a user may set, well in advance, predetermined criteria regarding the conditions that should trigger a desired playback rate. For example, the user may indicate that when certain designated undesirable content is detected (e.g., commercials) that the desired playback rate would be an accelerated playback rate. Accordingly, the user request need not be proximate in time to the actual playback of the multimedia data that is in response to the user request. In other cases, manufacturer default settings may determine when to play at certain desired playback rates. For example, the desired playback rate may be accelerated when a commercial is detected even if no user input had been received on the subject.

The data that is stored and rendered, according to the present embodiment, includes multimedia data that is composed of a plurality of frames that can be processed by the computing system and rendered by appropriate rendering devices.

Upon receiving the user request for the data at a desired playback rate, it is determined that only selected frames of the data should be transmitted to the rendering device(s) for subsequent rendering (act 312). The determination that only selected frames of the data should be transmitted to the rendering device (act 312) may be based upon various factors. For instance, the determination may be made upon determining that the capacity to transmit data through the communication link between the computing system and the rendering device(s) is exhausted.

The determination that only selected frames should be transmitted (act 312) may also be based on or limited to the speed at which the computing system is able to process (e.g. read and decode) the data. The determination may also be made based upon the determination that not all of the data will be rendered, even if it is transmitted. For example, the refresh rate of the rendering device may effectively prevent the rendering device from rendering all of the transmitted frames of the data at the desired playback rate.

The determination to only transmit selected frames (act 312) can also be made when certain default criteria are satisfied. For instance, the computing system may be configured to transmit only selected frames when the user request requires the data to be played back at a rate exceeding a maximum value. For instance if the maximum value is 4x, or four times the normal or intended playback rate, then anytime the user requests the data to be played faster than 4x, the determination to only transmit selected framed of the data may be made. The default settings that may lead to a determination that only selected frames should be transmitted are described in more detail below with specific reference to the disclosure corresponding to FIGS. 5–7.

Next, as illustrated in FIG. 3, the present method includes the step for selecting certain key frames to be sent to the appropriate rendering device(s) (step 300), which will be described in terms of corresponding acts (acts 314, 316, 318, 320 and 322). In particular, the step for selecting the key frames to be sent (step 300) includes the corresponding acts of reading the frames of the data (act 314), calculating an incremental duration of multimedia data to skip over between selected key frames (act 316), identifying a first encountered key frame (act 318), selecting the identified key frame (act 320), and skipping over the incremental duration of multimedia data (act 332).

The act of reading the frames of the data (act 314) should be broadly construed to include any act or acts in which the multimedia data is examined sufficient to identify when a frame is a key frame. Key frames are frames that can be read, processed (i.e., decoded), and rendered independently of other frames. For example, in MPEG, "I-frames" are key frames since they can be read and rendered without reference to any other frame in the MPEG stream. Whereas, in Digital Video (DV), all frames are key frames. Nevertheless, it will be appreciated that the application of the present invention extends to all types of data formats having key frames, as defined herein. Examples of data formats that may be utilized with the present invention include, but are not limited to, MPEG (Moving Picture Experts Group), DV (Digital Video), WMV (Windows Media Video), WMA (Windows Media Audio), and ASF (Advanced Streaming Format).

Several of the acts (acts 318, 320 and 322) may be repeated several times, as indicated by arrow 350, to ensure the requisite key frames are selected and processed. It may also be desired to repeat other acts, such as calculating the duration of content to skip over (act 316). It may be desirable to repeat act 320, for example, when the capacity of the communication link between the computing system and the rendering device(s) is subject to change due to fluctuations in the demand for bandwidth by different viewer requests.

Once the identified key frames are selected, the time stamps assigned to each of the selected key frames are scaled appropriately so that the selected key frames can be displayed for an appropriate duration of time by the appropriate rendering device (act 324). It will be appreciated by those skilled in the art upon reading this application that the act of scaling the time stamps (act 324) may occur only when the requested playback rate is different than the intended playback rate.

The method illustrated in FIG. 3 also includes the act of transmitting the selected key frames to the appropriate rendering devices (act 326) so that the multimedia data can be rendered.

Detailed examples will now be provided, with specific reference to FIGS. 4–7, to help explain the acts and step that are identified in FIG. 3.

Figure 4:
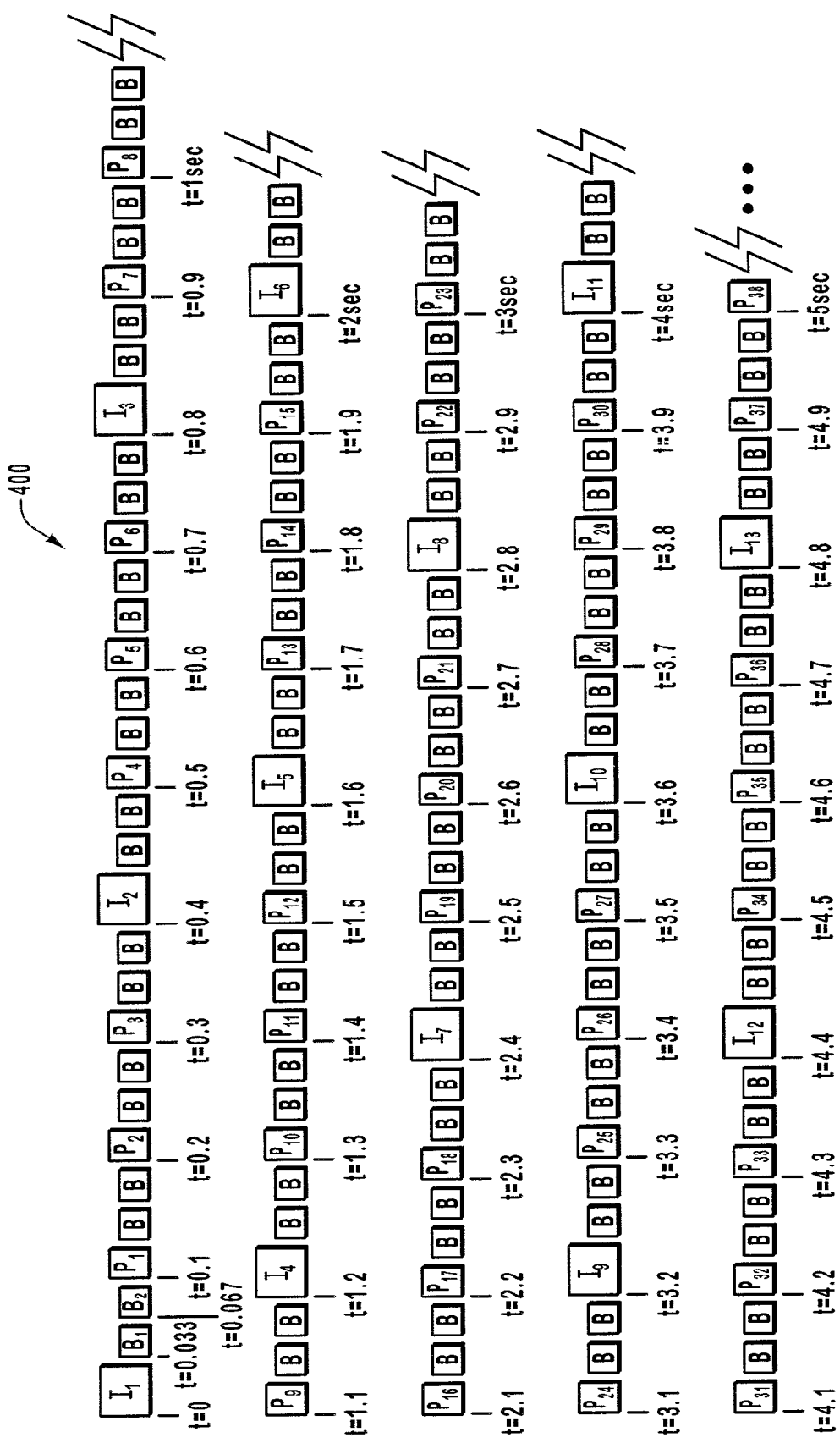
FIG. 4 illustrates one embodiment of a digital data sample that includes a plurality of frames, including 'I' key frames and 'B' and 'P' delta frames.

FIG. 4 is provided to illustrate one example of a data sample 400 that may be stored on a storage medium, accessed by a computing system, and rendered by an appropriate rendering device according to the invention. Data sample 400 includes a plurality of I frames, B frames, and P frames encoded with an MPEG format. However, it will be appreciated by those of skill in the art, upon reading this application, that the types of frames and the number of frames included in data sample 400 may vary and that the methods of the invention are not limited to the use of any particular data format. It will also be appreciated that the number and types of frames included in the data sample 400 may vary in different embodiments according to the varying sizes of data samples and the different types of data formatting that may be used to encode the data sample.

According to one embodiment, the frames of the data sample 400 are categorized as either key frames or delta frames. Delta frames are frames that depend on other frames and cannot be rendered independently. Accordingly, in an MPEG stream, as used in the present embodiment, I frames are considered key frames inasmuch as they can be read and rendered independently of other frames, whereas B and P frames are considered delta frames because they depend on other frames (e.g. the I frames and perhaps other P frames) and cannot be read and rendered without the use of the other frames from which they depend. The categorization of frames as either key frames or delta frames will vary between the different types of data formats that may be used to encode the data sample 400.

As shown in FIG. 4, some of the frames have been assigned time stamps, designated by t=(n), wherein t is time and n is the time stamp assigned to the corresponding frame in terms of seconds. For instance, key frame I1 is assigned a time stamp of 0 seconds, delta frame P1 is assigned a time stamp of 0.1 seconds, delta frame P2 is assigned a time stamp of 0.2 seconds, delta frame P3 is assigned a time stamp of 0.3 seconds, key frame I2 is assigned a time stamp of 0.4 seconds, and so forth.

Although the present embodiment shows that only two of the B frames have assigned time stamps, it will be appreciated that time stamps may be assigned to any number of the B frames. Furthermore, although every key frame is shown to be assigned a time stamp, it will be appreciated that it is not necessary for every key frame to be assigned a time stamp when the key frame is received by the computing system. In particular, a key frame that is not assigned to a time stamp prior to being stored can be assigned a time stamp at any point, if necessary, prior to rendering the selected key frame on a rendering device. For example, if key frame I2 did not have a time stamp upon being received, an appropriate time stamp may be determined by considering where key frame I2 falls within the data. In the present example, an appropriate time stamp for key frame I2 is 0.4 seconds because key frame I2 falls equally between delta frame P3, which has a time stamp of 0.3, and delta frame P4, which has a time stamp of 0.5.

The time stamps that are assigned to the plurality of frames correspond with an intended playback rate for rendering the data sample. For instance, when the data sample 400 is rendered at the normal or intended playback rate, each frame will be rendered for about $\frac{1}{30}^{th}$ of a second, or about 33.33 milliseconds, as indicated by their time stamps. For instance, at time t=0 key frame I1 will be rendered, at a of time t=0.033 seconds delta frame B1 will be rendered, at a time of t=0.067 seconds delta frame B2 will be rendered, and so forth, so that after a period of 5 seconds, all 150 frames illustrated in the present data sample 400 will have been rendered.

As mentioned above, the computing system of the invention accesses data, such as data sample 400, from a storage medium and transmits the data to one or more rendering devices in communication with the computing system. Although the data is typically rendered by the rendering devices at the intended playback rate of the assigned time stamps of the stored data, the rate at which the data is displayed may be varied by changing the time stamps assigned to the data sample. For instance, if each of the time stamps assigned to the data sample 400 were decreased by a factor of ten then the data sample 400 would be rendered at ten times the speed (10×), such that the 150 frames displayed in FIG. 4 would be displayed in a period of 0.5 seconds instead of the intended 5.0 seconds.

Altering the time stamps assigned to the data sample 400 can be useful for enabling trick play functionality, such as, for example, accelerating or decelerating the playback rate of the data sample 400. However, by increasing the playback rate of the data sample 400, more bandwidth is required to transmit the data sample 400. For example, if 150 frames are transmitted in 5.0 seconds at a normal playback rate, then at a playback rate of 10×, 1500 frames will be transmitted in the same period of 5.0 seconds. It will be appreciated that transmitting 1500 frames in 5.0 seconds requires more bandwidth than transmitting 150 frames in 5.0 seconds. Accordingly, at some point, depending on the capabilities of the computing system and communication links, the capacity to transmit data will be exceeded. The point at which the capacity to transmit data will be exceeded will depend on various factors. For instance, at very high playback speeds, a single data transmission may exceed the bandwidth capacity of the communication link. However, even at very low playback speeds, the bandwidth capacity of the communication link can be exceeded when multiple transmissions occur at the same time.

Constraints on the ability to read and process data at very high speeds can also limit the capacity to transmit data. In particular, data can only be transmitted at the rate it is read and processed from the storage medium. Accordingly, the capacity to transmit data may be constrained by the speed at which data can be read and processed, rather than the capacity of the communication link to carry the data transmissions. Yet another constraint may include the refresh-rate of the display device. In particular, it doesn't make any sense to transmit the frames at a faster rate than the rate at which the frames can be displayed. For example, in one embodiment the refresh rate is about 60 frames per second (e.g. 60 Hertz).

Constraints placed on the capacity of the computing system to process and transmit data create some of the problems experienced by typical PVR devices, such as data loss and poor imaging quality, as described above. The present invention overcomes these problems, however, despite the constraints by selecting only certain frames of the data to be transmitted to the rendering device(s), thereby minimizing the demands for processing the data and the bandwidth requirements for transmitting the data, and thereby reducing the likelihood that data will be lost.

According to one aspect of the invention, the computing system has four different modes under which it selects the data to be processed and transferred, namely, (1) a full frame mode, (2) a key frame mode, (3) a key frame plus seek mode, and (4) a key frame plus seek with an accelerator mode, each of which will now be described.

In a full frame mode, every frame is transmitted to the appropriate rendering device at the playback rate requested by the viewer. For example, at a requested playback speed of 5×, every frame is transmitted, only five times faster than at the normal speed. Accordingly, the data is rendered at five times the normal speed. To enable playback at this accelerated speed, the time stamps of the data sample may need to be decreased by a factor of five so that each frame is displayed for only $\frac{1}{5}^{th}$ the time previously dictated by the assigned time stamps.

Figure 5:
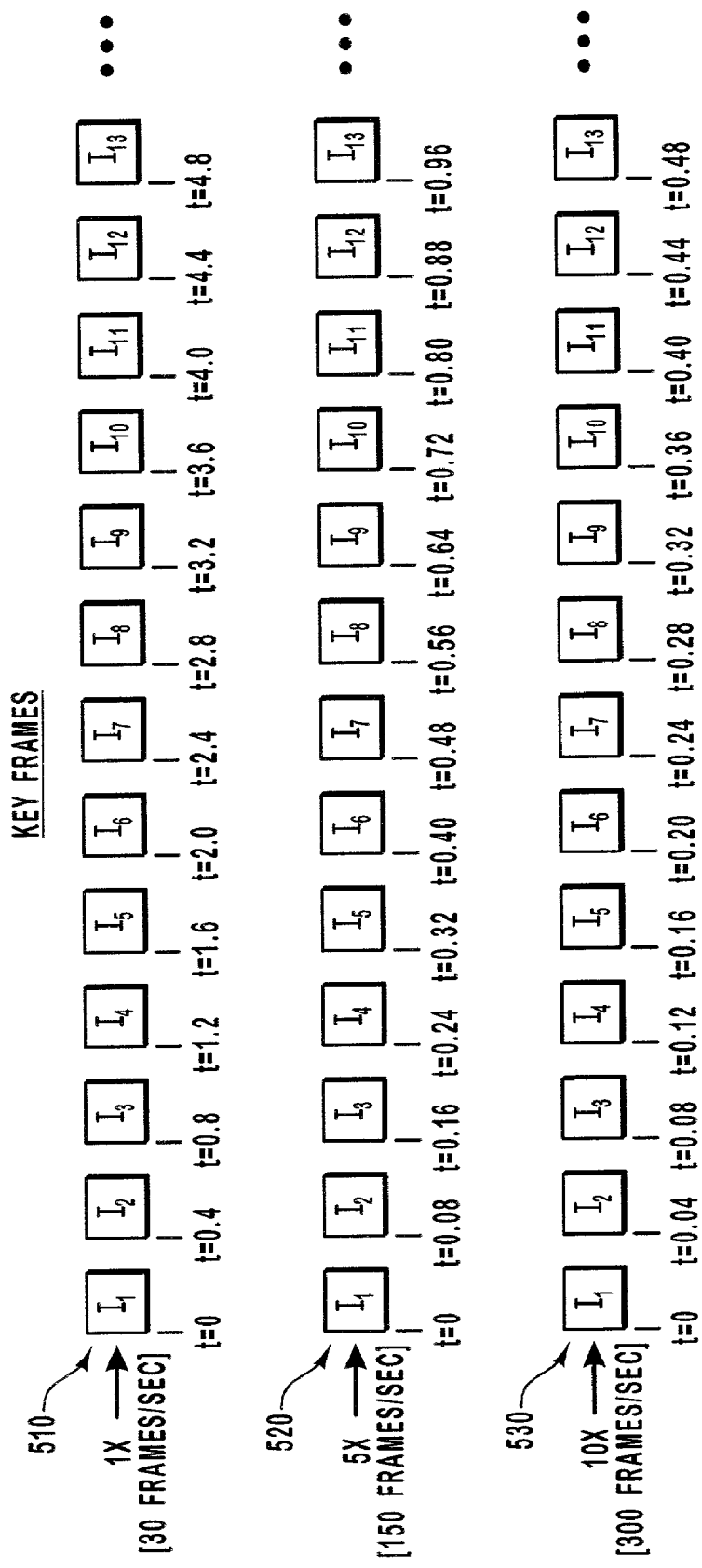
FIG. 5 illustrates strings of 'I' key frames that have been selected from the data sample of FIG. 4 based upon 1×, 5× and 10× key frame playback rates, and in which the time stamps assigned to each of the 'I' key frames have been scaled according to the desired playback rates.

In a key frame mode, only the key frames are transmitted to the appropriate rendering device. For example, FIG. 5 illustrates the key frames that are selected from the data sample 400 of FIG. 4 to be rendered by a rendering device at speeds of 1× (normal), 5×, and 10×. As shown, at a speed of 1×, which comprises a playback speed of 30 frames per second, the string of key frames 510 selected to be transmitted to the rendering device includes only the I frames corresponding to the five second data sample 400 illustrated in FIG. 4. In particular, only key frames I1, I2, I3, I4, I5, I6, I7, I8, I9, I10, I11, I12 and I13 are selected to be processed and transferred to the appropriate rendering device. Even at speeds of 5× and 10×, the same few key frames are selected, as shown by strings 520 and 530.

FIG. 5 also illustrates how the time stamps assigned to the key frames may be scaled so that the key frames will be rendered for an appropriate duration of time corresponding to the desired playback rates. For example, at a playback rate of 5× (or the equivalent speed of 150 frames per second if every frame was played), the time stamp assigned to each of the key frames will be reduced by a factor of five so that each frame will be displayed for $\frac{1}{5}^{th}$ of the time previously assigned to the frames. Likewise, at the playback rate of 10×, the time stamp assigned to each key frame is reduced by a factor of 10 so each frame will be displayed for $\frac{1}{10}^{th}$ of the time previously allotted for normal playback.

The key frame mode is particularly useful, as described herein, for reducing the amount of data that has to be processed and transmitted at various playback rates. However, even when the key frame mode is implemented, the capacity of the computing system to process and transmit the requested data may be insufficient to process and transmit every key frame. By way of example, and not limitation, the capacity of the computing system to process and transmit all of the key frames may be exhausted when multiple rendering devices are receiving independent data transmissions from the computing system. When the capacity to process and transmit data is exhausted, the computing system will be unable to simultaneously process new requests for data. In these circumstances, it may be desirable to switch to a key frame plus seek mode, as described below, to reduce the resources and bandwidth required to transmit the data to the rendering devices.

The key frame plus seek mode utilizes an algorithm to select only certain key frames from the data sample to be processed and transmitted to the appropriate rendering devices. According to one embodiment, the algorithm utilized by the key frame plus seek mode comprises:

$$D = IG + IG * A$$

wherein D is the duration of multimedia data to skip over (act 322) after a key frame is identified and selected (acts 316 and 318). IG is a constant value comprising the index of granularity of the data sample. According to one embodiment, the index of granularity is the granularity in which the viewer is able to seek for particular data. For instance, if the computing system enables a viewer to seek data to within 500 milliseconds, or 0.5 seconds, then the index of granularity is 0.5 seconds. The index of granularity may vary in different embodiments, however, to accommodate different needs and preferences. According to one embodiment, the index of granularity is within a range of about 0.1 second and about 10 seconds.

Parameter A in the equation comprises an accelerator for controlling how aggressively the data multimedia data is skipped over. The value of the accelerator A is computed according to the following formula:

$$A = \frac{(Rn - R\max)}{R\max}$$

wherein Rn is the new desired playback rate, and wherein Rmax is the maximum rate in which the data can be played back in the key frame mode before the computing system switches to the key frame plus seek mode. According to one embodiment, Rmax is a value within a range of between about 4× and about 10× such as, for example, 6×.

An example will now be provided to illustrate how to select the key frames to be processed and transmitted to the rendering device(s) in a key frame plus seek mode, with specific reference to the data sample illustrated in FIG. 4. In this present example, in which the maximum non-skip rate Rmax will be set at 4×, the index of granularity IG will be 0.5 seconds, and the desired playback rate will be 5×.

According to the above-formula, at a desired playback speed of 5×, the accelerator A comprises (5×−4×)/4×, which is equal to ¼ or 0.25. Accordingly, the duration of multimedia data D that should be skipped over between each encountered key frame comprises (0.5 second)+(0.5 second) *0.25, which is equal to 0.625 second, or 625 milliseconds.

Therefore, according to one method of the invention, as illustrated in FIG. 3, certain key frames are selected by iteratively performing the acts of selecting a first encountered key frame (acts 316 and 318) and skipping over a duration of multimedia data (act 322) comprising 625 milliseconds, then repeating the process. For example, with reference to data sample 400 of FIG. 4, the first encountered key frame is key frame I1, so it is selected. Next, 0.625 seconds of data multimedia data are skipped over, based on the time stamps assigned to the data sample 400, which places the reader just after delta frame P5, which has a time stamp of t=0.6. Accordingly, the next encountered key frame is key frame I3, which is selected and the process of skipping over data and selecting the next encountered key frame is repeated.

Skipping over the next 0.625 seconds, after key frame I3, places the reader at a time of 1.425 seconds (0.8 seconds+ 0.625 seconds), which is just after delta frame P11, such that the next encountered and selected key frame is key frame I5. When this process is repeated until the reader has advanced through the entire five seconds of content of the data sample 400, the string of selected key frames for the 5× playback rate will include key frames I1, I3, I5, I7, I9, I11, and I13, as illustrated by the string 610 of key frames shown in FIG. 6. Accordingly, with the key frame plus seek mode, fewer key frames are selected to be transmitted to the rendering device than where selected in the key frame mode at the same 5× speed. In particular, a playback rate of 5× in the key frame mode resulted in thirteen key frames being selected, whereas only seven where selected at a playback rate of 5× in the key frame plus seek mode (with a granularity of 0.5 seconds). This reduction in selected key frames can free up resources and help reduce the bandwidth and processing requirement for transmitting the data at the desired playback rate. The amount of bandwidth that is freed up by selecting only certain key frames will depend, naturally, on the type of formatting that is used. For example, the overhead of processing (decoding) MPEG key frames is much less than the overhead that is required to process (decode) DV key frames. This is because MPEG key frames (I frames) are already largely uncompressed. Accordingly, the effect on bandwidth of bypassing certain key frames is much more significant for DV formats than for MPEG formats.

The reduction in the number of key frames that are transmitted as a result of operating in the key frame plus seek mode is even more amplified at higher playback rates. For example, assuming the maximum non-skip rate Rmax is still set at 4× and the index of granularity IG is still 0.5 seconds, a desired playback rate of 10× will result in an accelerator A comprising (10×−4×)/4×, which is equal to 6/4 or 1.5. Accordingly, the duration of multimedia data D that should be skipped over at 10× between each encountered key frame comprises (0.5 second)+(0.5 second)*1.5, which is equal to 1.25 seconds.

Accordingly, upon selecting the first encountered key frame I1, and upon skipping over the duration of multimedia data of 1.25 seconds, the reader is placed right between key frame I4 (having a time stamp of 1.2 seconds) and delta frame P10 (having a time stamp of 1.3 seconds). Therefore, the next encountered key frame is key frame I5. Upon skipping over the next 1.25 seconds of multimedia data, the reader is placed at a time of 2.85 seconds (1.6 seconds+1.25 seconds), which is just between key frame I8 (having a time stamp of 2.8 seconds) and delta frame P22 (having a time stamp of 2.9 seconds). Therefore, the next encountered key frame is key frame I9. Upon skipping over the next 1.25 seconds of multimedia data, the reader is placed at a time of 4.45 seconds (3.2 seconds+1.25 seconds), which is just between key frame I12 (having a time stamp of 4.4 seconds) and delta frame P34 (having a time stamp of 4.5 seconds). Therefore, the next key frame encountered in the data stream 400 is key frame I13. Accordingly, at a playback rate of 10× in the key frame plus seek mode (with a granularity of 0.5 seconds), only four key frames are selected. In particular, the string 620 of selected key frames includes key frame I1, I5, I9 and I13, or every fourth key frame.

At a playback rate of 20×, assuming the same index of granularity and maximum non-skip rate, the accelerator A comprises (20×−4×)/4×, which is equal to 16/4 or 4. Accordingly, the duration of multimedia data D that should be skipped over between each encountered key frame comprises (0.5 second)+(0.5 second)*4, which is equal to 2.5 seconds.

Accordingly, at 20× in the key frame plus seek mode, the first key frame I1 is selected, then a duration of multimedia data corresponding to 2.5 seconds is skipped, such that the reader is placed at delta frame P19, and such that next encountered and selected key frame is key frame I8, which has a time stamp of 2.8 seconds. Skipping over the next 2.5 seconds of multimedia data (2.8 seconds+2.5 seconds=5.3 seconds) places the reader beyond the five seconds of multimedia data shown for the data sample 400. Accordingly, as illustrated by the string 630 of selected key frames I1 and I8, every seventh key frame is selected. At this rate, and assuming the data sample 400 is continuous, the next selected key frame will be I15, and so forth.

Upon selecting the key frames to be transmitted to the rendering device, it is necessary to scale the time stamps of the selected key frames so that they will be rendered for an appropriate duration corresponding to the desired playback rates. For example, at the 5× playback rate, it is desired that the data is displayed at five times the normal rate. Accordingly, it is desired that after one second that five seconds of multimedia data will have been displayed. To do this, each time stamp is reduced by a factor of five, such that key frame I1 will have an adjusted time stamp of 0/5=0, key frame I3 will have an adjusted time stamp of 0.8/5=0.16, key frame I5 will have an adjusted time stamp of 1.6/5=0.32, and so forth, as indicated by the string 610 of data samples shown in FIG. 6. Accordingly, each data sample will be displayed for a duration of 0.16 seconds.

At a playback rate of 10×, the time stamps must be adjusted by a factor of 10, such that key frame I1 will have an adjusted time stamp of 0/10=0, key frame I5 will have an adjusted time stamp of 1.6/10=0.16, key frame I9 will have an adjusted time stamp of 3.2/10=0.32, and so forth, as indicated by string 620. Accordingly, each data sample will be displayed for a duration of 0.16 seconds.

At a playback rate of 20×, the time stamps must be adjusted by a factor of 20, such that key frame I1 will have an adjusted time stamp of 0/20=0, key frame I8 will have an adjusted time stamp of 2.8/20=0.14, and so forth. Accordingly, each data sample will be displayed for a duration of 0.14 seconds.

Although the key frame plus seek mode, as it has been described, can significantly reduce the number of frames that must be transmitted, it may still be necessary to reduce the number of selected frames even more. For example, when there are multiple rendering devices that are receiving data at different playback rates, the capacity of the communication link between the computing system and the rendering devices may be exhausted, such that it may not be logistically possible to honor any new requests for data.

For example, if the capacity to transmit data is completely exhausted by a plurality of current data transmissions, it would be impossible for the computing system to simultaneously honor a new request for data by a different viewer on a different rendering device. This is a problem because it limits the utility and scalability of the computing system to the bandwidth capacity of the communication link.

The present invention overcomes this problem, however, by providing a fourth mode in which the computing system can operate to ensure that additional requests for data can be honored. This is accomplished by providing an accelerator control value that can be dynamically changed to accommodate fluctuations in the bandwidth of data transmissions between the computing system and multiple rendering devices. According to one embodiment, the accelerator control value K is included within the key frame plus seek formula as follows:

$$D=IG+IG*A*K$$

Under normal circumstances the accelerator control value K may remain at 1, making it negligible, such that the result will be the same as operating in the key frame plus seek mode. However, at times in which the capacity to process and transmit data is exhausted, the accelerator control value K can be increased to reduce the processing resources and bandwidth required to process and transmit data to the rendering devices.

Figure 6:
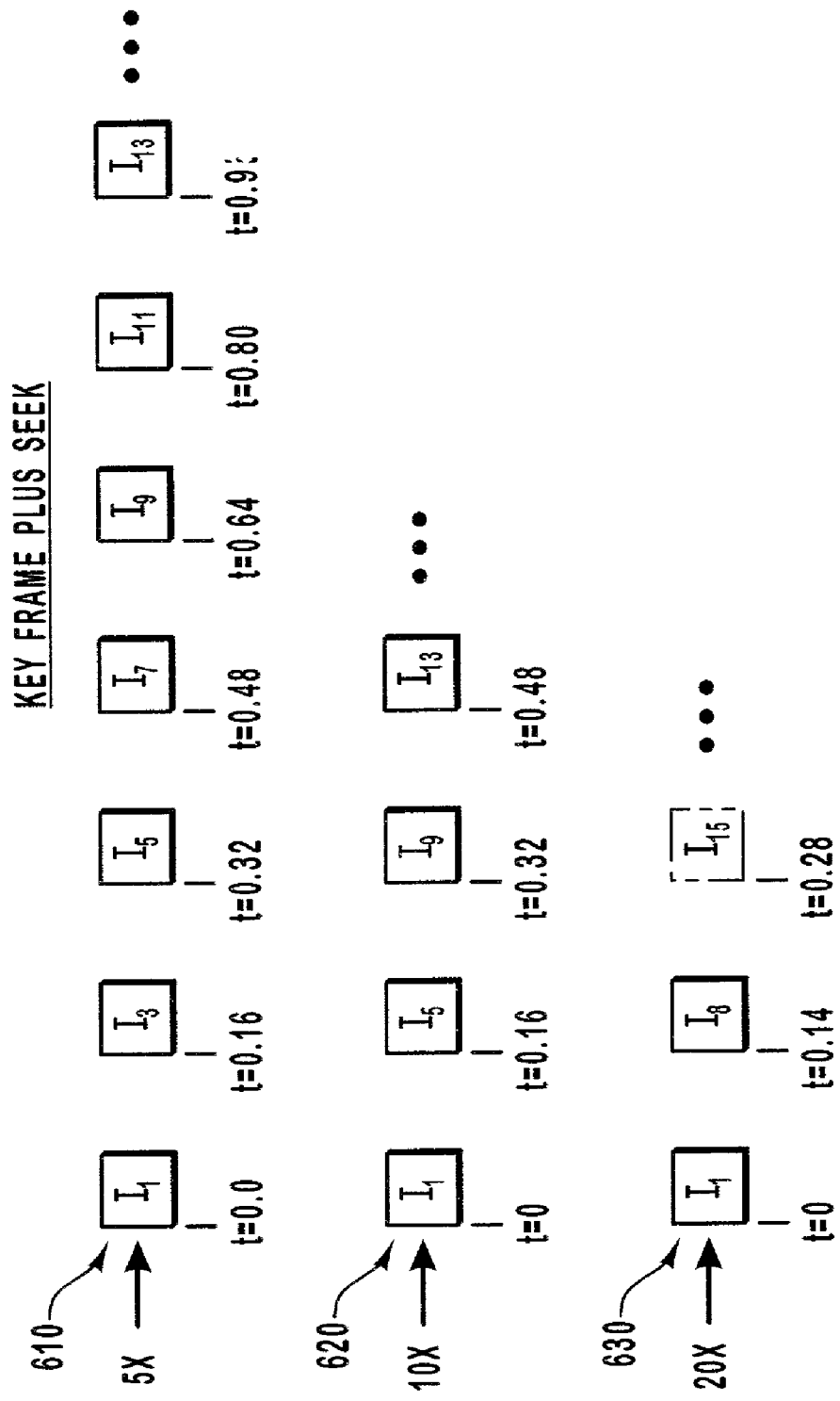
FIG. 6 illustrates strings of 'I' key frames that have been selected from the data sample of FIG. 4 based upon 5×, 10× and 20× key frame plus seek playback rates, and in which the time stamps assigned to each of the 'I' key frames have been scaled according to the desired playback rates.

For example, if the capacity to transmit data is completely exhausted by a plurality of different data transmissions, one of which includes string 610 of FIG. 6, then it may still be possible to honor a new request for data, by using the accelerator control value to reduce the number of key frames that must be processed and transmitted for existing data requests.

An example will now be provided to illustrate how the number of selected key frames to be processed and transmitted can be reduced by increasing the accelerator control value K. For example, when data sample 400 is played back at a rate of 5× in a key frame plus seek mode with no accelerator control value K or in a key frame plus seek mode with an accelerator control value of K=1, in which the maximum non-skip rate Rmax is set at 4×, and in which the index of granularity IG is 0.5 seconds, the resulting string 610 of data that is processed and transmitted to the rendering device comprises I1, I3, I5, I7, I9, I11 and I13, as described above, in reference to FIG. 6.

However, by increasing the accelerator control value to K=3, it is possible to further reduce the number of key frames that are selected to be processed and transmitted. For example, assuming the same desired playback rate (5×), the same maximum non-skip rate (4×) the same index of granularity (0.5 seconds), and therefore the same accelerator A ((5×−4×)/4×=0.25), then the new calculated duration of multimedia data D that must be skipped over between each encountered key frame will comprise ((0.5 seconds)+(0.5 seconds)*(0.25)*(3))=0.875 seconds.

Using this new duration of multimedia data D that must be skipped over, it is now possible to select the key frames to be processes and transmitted. In particular, upon selecting the first key frame I1 and skipping the duration of multimedia data corresponding to 0.875 seconds, the reader is placed just beyond key frame I3, such that the next encountered and selected key frame is key frame I4, which has a time stamp of 1.2. Skipping over the next 0.875 seconds of multimedia data (1.2 seconds+0.875 seconds) advances the reader to a time of 2.075 seconds, which is just beyond key frame I6. Accordingly, the next selected key frame is key frame I7. Upon skipping over the next 0.875 seconds of multimedia data from key frame I7 (2.4 seconds+0.875 seconds) the reader is advanced to a data content time of 3.275, which is just beyond key frame I9, such that the next selected frame is I10. Finally, after skipping over the next 0.875 seconds of multimedia data, key frame I13 is selected.

Figure 7:
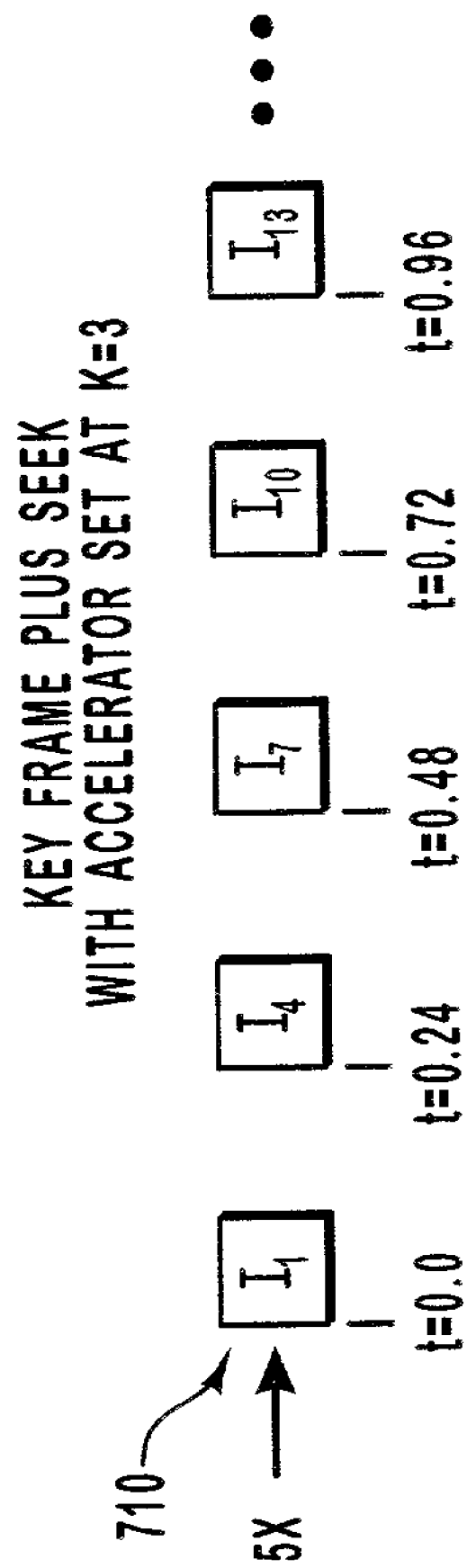
FIG. 7 illustrates a strings of 'I' key frames that have been selected from the data sample of FIG. 4 based upon a 5× key frame plus seek playback rate that includes an accelerator value of 3, and in which the time stamps assigned to each of the 'I' key frames have been scaled according to the desired playback rate.

Accordingly, as illustrated in FIG. 7, setting the accelerator control value to K=3, as opposed to K=1, reduces the total number of key frames that are selected to be processed and transmitted to the rendering device. In particular, the string 710 of key frames that are selected to be processed and transmitted to the rendering device, when the accelerator control value K is set at 3, only includes five key frames for the same amount of multimedia data that previously required seven key frames (see string 610 of FIG. 6), with no accelerator control value K or an accelerator control value of K=1.

Once the key frames have been selected, the time stamps assigned to the key frames need to be scaled, for reasons described above. In the present example, the data is played back at a rate of 5×, so each time stamp will be reduced by a factor of five. Accordingly, key frame I1 will have an adjusted time stamp of 0/5=0, key frame I2 will have an adjusted time stamp of 1.2/5=0.24, key frame I7 will have an adjusted time stamp of 2.4/5=0.48, and so forth.

During use, the value of the accelerator control value K can be dynamically changed to accommodate fluctuations in the number of data transmissions to multiple rendering devices and the bandwidth required by each data transmission to play back requested data at a desired rate.

In summary, the present invention provides a method for enabling the computing system to play back stored data at variable playback rates even when the capacity to process and transmit data is exhausted. According to the invention, the computing system is also able to manage and simultaneously process multiple requests for the data from multiple viewers at different rendering devices. Yet according to another aspect of the invention, the computing system is able to process and transmit data a variable playback rates on a continuum without being limited to a predetermined set of playback rates. Accordingly, it will be appreciated that for at least these reasons, the methods and systems of the present invention are an improvement over the prior art PVR devices and corresponding methods for rendering data at variable playback rates.

It will also be appreciated by those skilled in the art, upon reading this application, that the present invention may be embodied in other specific forms without departing from its spirit or essential characteristics. For instance, the methods of the invention can also be implemented when the requested playback rate is a reverse playback rate.

In reverse playback, however, the key frames are selected while advancing in reverse through the multimedia data. For instance, in reverse playback, multimedia data is skipped over backwards between each encountered key frame. Scaling of the time stamps for data played back in reverse can also be accomplished by determining the duration each selected frame is to displayed, as generally described above, and then replacing each time stamp with a new time stamp. In one embodiment, the first transmitted frame is assigned a time stamp of zero and then each subsequently transmitted frame will be given a new time stamp that comprises the time stamp of the previous frame plus the determined duration each time stamp is to be displayed.

It will be appreciated that although certain embodiments provided herein specifically describe how processed data is transmitted to rendering devices or other remote devices, the invention is not limited to such embodiments. Rather, the invention also extends to embodiments in which processed data is transmitted internally, within the computing system, to internal modules and computing applications where the data is further processed, accessed, stored or manipulated in some desired manner.

Accordingly, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system that is connected with a storage medium that stores multimedia data, the computing system being connectable to at least one remote device that is configured to receive the multimedia data at a desired playback rate specified by a user request, and wherein the stored multimedia data includes a plurality of frames that are assigned time stamps corresponding to an intended playback rate of the multimedia data, a method for selecting certain key frames from the multimedia data and for scaling the time stamps assigned to the selected key frames so that the multimedia data can be rendered by at least one rendering device at the desired playback rate, the method comprising:

an act of determining a desired playback rate of the stored multimedia data;

optionally an act of determining that only certain selected frames of the multimedia data should be transmitted to the at least one device in order to accomplish the desired playback rate;

an act of calculating an incremental duration of multimedia data to be skipped over, wherein the incremental duration corresponds to the time stamps assigned to the frames of the data;

upon determining that only certain selected frames should be transmitted, iteratively performing acts of:

identifying a first encountered key frame, wherein the key frame is a frame that can be decoded and rendered without the use of any other frame of the multimedia data, selecting the identified key frame as a selected frame to be sent to the at least one remote device, and skipping over the calculated duration of the multimedia data; and an act of scaling the time stamp assigned to each selected key frame so that the selected key frame can be rendered for an appropriate duration of time by the at least one rendering device in accordance with the desired playback rate specified by the user request.

2. A method as recited in claim 1, wherein the computing system communicates with the at least one rendering device through the at least one remote device.

3. A method as recited in claim 1, wherein the at least one remote device comprises the at least one rendering device.

4. A method as recited in claim 1, further including the act of transmitting the selected key frames to the at least one rendering device.

5. A method as recited in claim 4, wherein subsequent to transmitting the selected key frames, the method includes the act of decoding the selected key frames.

6. A method as recited in claim 1, wherein scaling the time stamp assigned to each selected key frame comprises the act of dividing each time stamp by the desired playback rate.

7. A method as recited in claim 1, wherein the desired playback rate that is different than the intended playback rate.

8. A method as recited in claim 1, wherein the acts of identifying a first encountered key frame, selecting the identified key frame, and skipping over the incremental duration of multimedia data are performed while advancing chronologically through the multimedia data based on the time stamps assigned to the plurality of frames.

9. A method as recited in claim 1, wherein every key frame is assigned a time stamp.

10. A method as recited in claim 9, wherein every frame that is transmitted to the at least one remote device is time stamped.

11. A method as recited in claim 1, wherein the storage medium is integrated within the computing system.

12. A method as recited in claim 1, wherein the certain selected frames include every key frame contained within the multimedia data.

13. A method as recited in claim 1, wherein the storage medium is one of a compact disk and a digital video disk.

14. A method as recited in claim 1, wherein the at least one rendering device communicates with the computing system through a communication link having a fixed bandwidth, and wherein the act of determining that only certain selected frames of the multimedia data should be transmitted to the at least one rendering device includes an act of determining that the fixed bandwidth would not allow every frame to be transmitted to the rendering device at the desired playback rate.

15. A method as recited in claim 1, wherein the at least one rendering device includes a plurality of rendering devices, and wherein the act of determining that only certain selected frames of the data should be transmitted to the at least one rendering device includes an act of determining that at least one other data transmission to at least one of the plurality of rendering devices exhausts a capacity of the computing system to transmit data.

16. A method as recited in claim 1, wherein the at least one rendering device includes a plurality of rendering devices, and wherein the act of determining that only certain selected frames of the data should be transmitted to the at least one rendering device includes an act of determining that the desired playback exceeds a predetermined maximum playback rate.

17. A method as recited in claim 1, wherein the act of determining that only certain selected frames of the data should be transmitted to the at least one rendering device includes an act of determining that a refresh rate of the at least one rendering device would not allow every frame corresponding to the data to be rendered at the desired playback rate.

18. A method as recited in claim 1, wherein the data is encoded in a format that includes at least one of MPEG, DV, WMV, WMA, and ASF.

19. A method as recited in claim 1, wherein the desired playback rate is between about 25 frames per second and 35 frames per second.

20. A method as recited in claim 1, wherein each key frame is an I frame of an MPEG stream.

21. A method as recited in claim 1, wherein the act of skipping over the incremental duration of multimedia data causes at least every other key frame in the multimedia data to be skipped.

22. A method as recited in claim 1, further including the act of transmitting certain frames to the at least one rendering device, and wherein the act of scaling the time stamp assigned to each selected key frame further includes the act of scaling the time stamp of each frame that is transmitted to the at least one rendering device.

23. A method as recited in claim 22, wherein the act of scaling the time stamps occurs prior to transmitting the certain frames to the at least one rendering device.

24. In a computing system that is connected with a storage medium that stores multimedia data, the computing system being connectable to at least one rendering device that is configured to render the multimedia data at a desired playback rate specified by a user request, and wherein the stored multimedia data includes a plurality of frames that are assigned time stamps corresponding to an intended playback rate of the data, a method for selecting certain key frames from the data and for scaling the time stamps assigned to the selected key frames so that the multimedia data can be rendered by the at least one rendering device at the desired playback rate, wherein a key frame is a frame that can be read, decoded and rendered without the use of any other frame of the multimedia data, the method comprising:

an act of determining a desired playback rate of the stored multimedia data;

an act of determining that only certain selected frames of the data should be transmitted to the at least one rendering device in order to accomplish the desired playback rate;

a step for selecting certain key frames to send to the at least one rendering device;

an act of scaling the time stamp assigned to each selected key frame so that the selected key frame can be rendered for an appropriate duration of time by the at least one rendering device in accordance with the desired playback rate.

25. A method as recited in claim 24, wherein the step for selecting certain key frames includes an act of calculating an incremental duration of multimedia data to be skipped over, wherein the incremental duration corresponds to the time stamps assigned to the frames of the data, and upon calculating the incremental duration, iteratively performing the acts of:

identifying a first encountered key frame,
selecting the identified key frame as a selected frame to be sent to the at least one rendering device, and
skipping over a calculated duration of multimedia data.

26. A method as recited in claim 25, wherein the calculated duration of multimedia is calculated by obtaining an accelerator value and then by multiplying the accelerator value by an index of granularity to obtain a new value and then by adding the index of granularity to the new value to obtain the calculated duration of multimedia data.

27. A method as recited in claim 26, wherein the index of granularity is a time value in a range of between about 0.1 seconds and about 10 seconds.

28. A method as recited in claim 26, wherein calculating the calculated duration of multimedia data further includes multiplying the product by an accelerator control value prior to adding the product to the index of granularity.

29. A method as recited in claim 28, wherein the accelerator control value is a value other than 1.

30. A method as recited in claim 28, wherein the accelerator control value is a value greater than 1.

31. A method as recited in claim 30, wherein the maximum non-skip rate is a value in a range of between about two times the intended playback rate and about ten times the intended playback rate.

32. A method as recited in claim 26, wherein the accelerator value is determined by subtracting the desired playback rate by a maximum non-skip rate to obtain a resultant rate and then by dividing the resultant rate by the maximum non-skip rate.

33. A computer program product for implementing, in a computing system that is connected with a storage medium that stores multimedia data, the computing system being connectable to at least one rendering device that is configured to render the multimedia data at a desired playback rate, and wherein the stored multimedia data includes a plurality of frames that are assigned time stamps corresponding to an intended playback rate of the multimedia data, a method for selecting certain key frames from the data and for scaling the time stamps assigned to the selected key frames so that the multimedia data can be rendered by at least one rendering device at the desired playback rate, the computer program product comprising:
one or more computer-readable media carrying computer executable instruction that when executed at the computing system cause the computing system to perform the method comprising:
an act of determining a desired playback rate of the stored multimedia data;
an act of determining that only certain selected frames of the multimedia data should be transmitted to at least one rendering device in order to accomplish the desired playback rate;
an act of calculating an incremental duration of multimedia data to be skipped over, wherein the incremental duration of multimedia data corresponds to the time stamps assigned to the frames of the multimedia data;
upon determining that only certain selected frames should be transmitted, iteratively performing acts of:
identifying a first encountered key frame, wherein the key frame is a frame that can be decoded and rendered without the use of any other frame of the multimedia data,
selecting the identified key frame as a selected frame to be sent to the at least one rendering device, and
skipping over the calculated duration of multimedia data; and
an act of scaling the time stamp assigned to each selected key frame so that each selected key frame can be rendered for an appropriate duration of time by the at least one rendering device in accordance with the desired playback rate specified by the user request.

34. A computer program product as recited in claim 33, wherein the storage medium is integrated within the computing system.

35. A computer program product as recited in claim 33, wherein the storage medium includes a temporary buffer.

36. A computer program product as recited in claim 33, wherein the storage medium is one of a compact disk and a digital video disk.

37. A computer program product as recited in claim 33, wherein the one or more computer-readable media are physical storage media.

38. The computer program product as recited in claim 37, wherein the one or more computer-readable media include system memory.

39. The computer program product as recited in claim 33, wherein the multimedia data includes data that is encoded in a format that includes at least one of MPEG, DV, WMV, WMA, and ASF.

40. A computer program product as recited in claim 39, wherein each key frame includes an I frame.

41. In a network that includes a computing system in communication with a storage medium that stores multimedia data and a plurality of rendering devices are each configured to render the multimedia data at desired playback rates, and wherein the stored multimedia data includes a plurality of frames that are assigned time stamps corresponding to an intended playback rate of the multimedia data, a method for selecting certain key frames from the multimedia data and for scaling the time stamps assigned to the selected key frames so that the data can be rendered by the rendering devices at the desired playback rates, the method comprising:
an act of receiving, at the computing system, a first user request for the stored data to be rendered by a first rendering device at a desired playback rate;
an act of determining, at the computing system, that only certain selected frames of the data should be transmitted to the first rendering device;
an act of calculating an incremental duration of multimedia data to be skipped over, wherein the incremental duration of multimedia data corresponds to the time stamps assigned to the frames of the multimedia data;
an act of reading the plurality of frames, at the computing system, and while reading the plurality of frames iteratively performing acts of:
identifying a first encountered key frame, wherein the key frame is a frame that can be decoded and rendered without the use of any other frame of the multimedia data,
selecting the identified key frame as a selected frame to be sent to the first rendering device, and
skipping over the calculated duration of multimedia data;
an act of scaling the time stamp assigned to the selected key frame so that the selected key frame can be rendered for an appropriate duration of time by the first rendering device in accordance with the desired playback rate specified by the first user request;

transmitting each selected key frame to the first rendering device; and rendering each selected key frame at the first rendering device for the appropriate duration.

42. A method as recited in claim 41, wherein the act of scaling the time stamp occurs at the computing system.

43. A method as recited in claim 41, wherein the act of scaling the time stamp occurs at the first rendering device.

44. A method as recited in claim 41, wherein the act of determining that only certain selected frames of the multimedia data should be transmitted to at least one rendering device includes an act of determining that at least one requested transmission of multimedia data to a second rendering device cannot occur when every frame of the multimedia data is sent to the first rendering device.

45. A method as recited in claim 44, wherein the certain selected frames include every key frame contained within the multimedia data.

46. A method as recited in claim 44, wherein the certain selected frames include only some of a plurality of key frames contained within the multimedia data.

47. A method as recited in claim 44, wherein the certain selected frames include key frames of a data stream.

48. A method as recited in claim 41, wherein the incremental duration of multimedia data is calculated by obtaining an accelerator value and then by multiplying the accelerator value by an index of granularity to obtain a new value and then by adding the new value to the index of granularity.

49. A method as recited in claim 48, wherein the index of granularity is a time value of within the range of about 0.1 second and about 10 seconds.

50. A method as recited in claim 48, wherein calculating the incremental duration of multimedia data further includes multiplying the new value by an accelerator control value prior to adding the new value to the index of granularity.

51. A method as recited in claim 50, wherein the accelerator control value is any value other than 1.

52. A method as recited in claim 48, wherein the accelerator value is determined by subtracting the desired playback rate by a maximum non-skip rate to obtain a resultant rate and then by dividing the resultant rate by the maximum non-skip rate.

53. A method as recited in claim 52, wherein the maximum non-skip rate is a value in a range of between about four times the intended playback rate and ten times the intended playback rate.

54. A method as recited in claim 41, wherein the network further includes a remote device, and wherein the selected key frames are transmitted to the first rendering device through the remote device.

* * * * *